United States Patent [19]

Tatsumi et al.

[11] Patent Number: 4,600,809

[45] Date of Patent: Jul. 15, 1986

[54] TELEPHONE SYSTEMS

[75] Inventors: Kaoru Tatsumi, Hino; Takao Kishida, Hachioji; Kuniyoshi Marui, Tokorozawa; Takaaki Ishii, Sagamihara, all of Japan

[73] Assignee: Kabushiki Kaisha Toshiba, Kawasaki, Japan

[21] Appl. No.: 613,646

[22] Filed: May 24, 1984

[30] Foreign Application Priority Data

Nov. 30, 1983 [JP] Japan ................. 58-226455

[51] Int. Cl.$^4$ ........................... H04M 11/10
[52] U.S. Cl. ................. 179/2 EA; 179/6.11; 179/81 R
[58] Field of Search ............. 179/2 EA, 5.5, 84 VF, 179/81 R, 84 C, 6.03, 6.04, 6.07, 6.11

[56] References Cited

U.S. PATENT DOCUMENTS 4,304,968 12/1981 Klausner et al. ............. 179/5.5 X
4,399,331 8/1983 Brown et al. ................. 179/6.04 X

*Primary Examiner*—James L. Dwyer
*Attorney, Agent, or Firm*—Finnegan, Henderson, Farabow, Garrett & Dunner

[57] ABSTRACT

In a telephone system having an automatic response function wherein a predetermined answer message is automatically sent to a calling originator when a speaking path to the calling originator is established in response to a call signal originated by calling from the calling originator, there are provided a DTMF signal decoder for decoding a DTMF signal sent from the calling originator as a result of key operation at the calling originator after the speaking path has been established, and a memory for storing operated key data corresponding to the output of the DTMF signal decoder, whereby information regarding the calling originator is obtained when the stored content of the memory is zero.

16 Claims, 6 Drawing Figures

(TO BE CONTINUED)

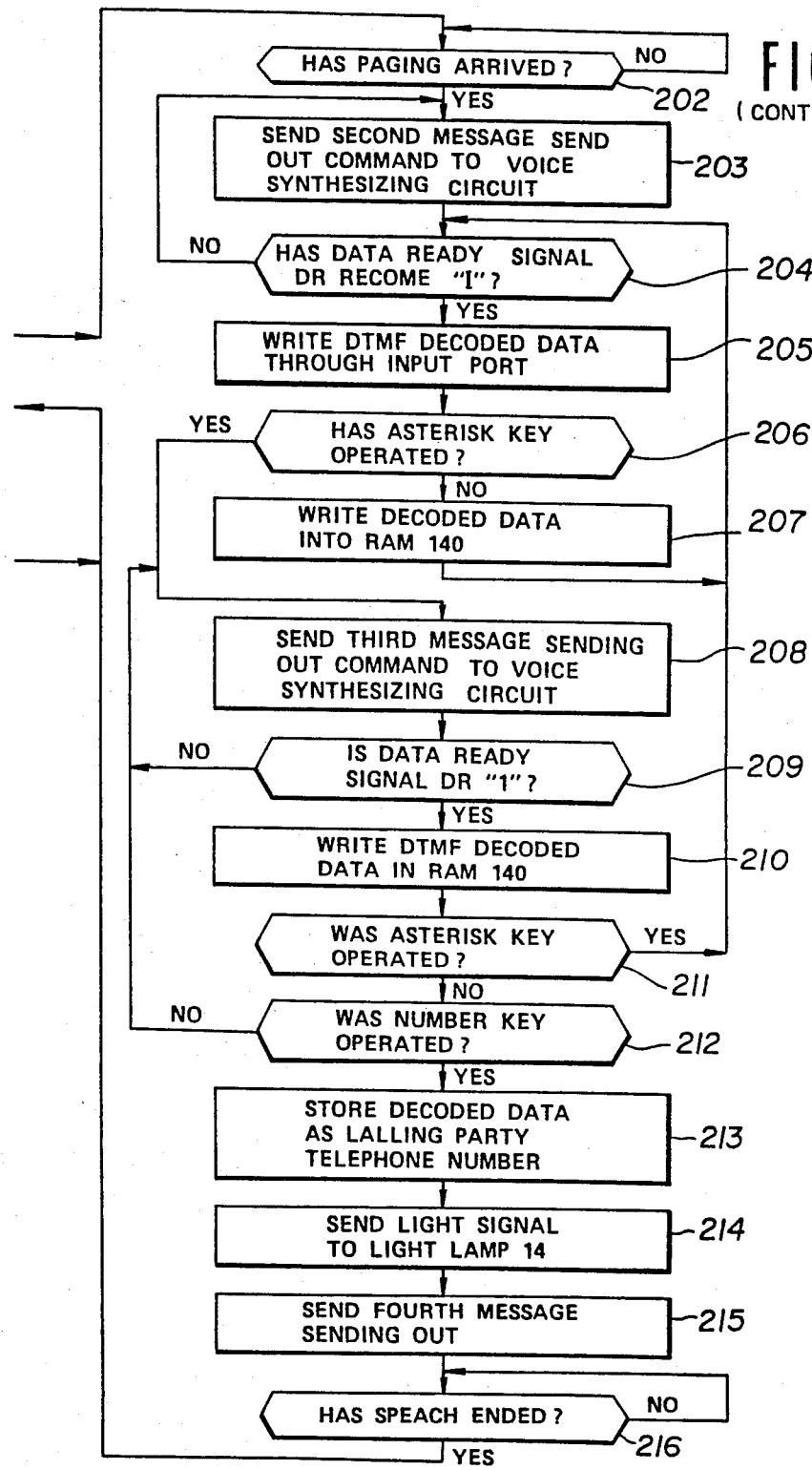

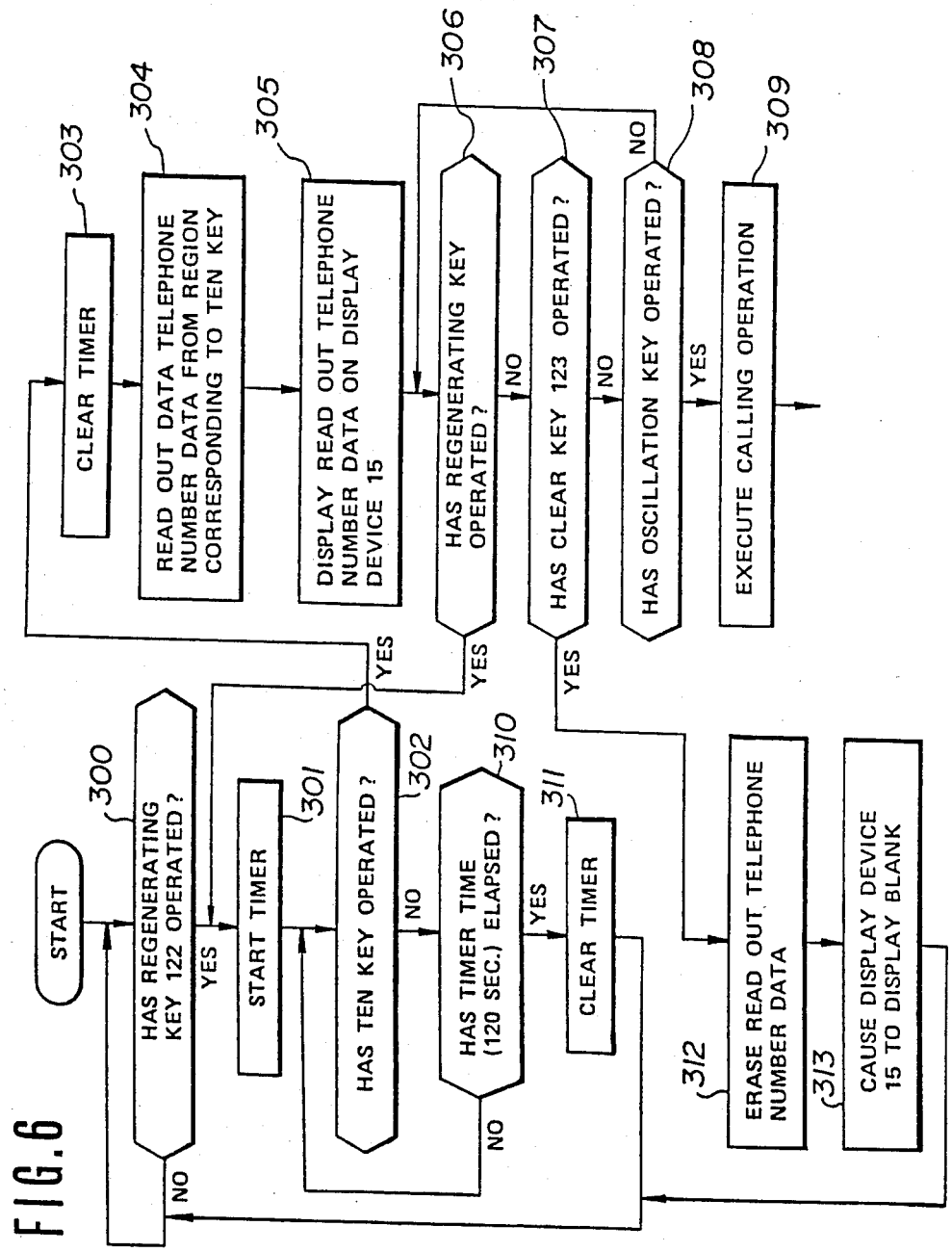

TELEPHONE SYSTEMS

BACKGROUND OF THE INVENTION

1. Field of the Invention

This invention relates to a telephone system having an automatic response performance, that is when a called party is absent, a voice reply is automatically sent to a calling party, and more particularly a telephone system in which a predetermined message from a calling party is memorized by utilizing a dual tone multifrequency (DTMF) signal issued by a calling party.

2. Description of the Prior Art

Various types of so-called automatic answering telephone devices have been used as telephone sets capable of automatically replying with voice to a calling party when a called party is absent. Basically such answering telephone set is constructed such that when a call signal arrives at an absent called party, it sends a message that the called party is absent to the calling party and then takes note of a message from the calling party whereby after returning back, the called party reproduces the message from the calling party to learn who telephoned while the called party was absent.

In the prior art telephone system of the type described above, recording of the message from the calling party has been made by recording the voice of the calling party on such recording medium as a magnetic tape. Such system is bulky because voice signals having indefinite information quantity are recorded, and because it has been obliged to use a recording device utilizing a magnetic tape or the like. At present, however, it is impossible to use a suitable voice recording device of small size.

In recent years, demand is increasing for automobile telephone sets and cordless telephone sets or the like which have an automatic response and message recording capability. However, when the prior art answering phone is used in a wireless telephone set, as the apparatus becomes bulky there arises problems of space and portability.

SUMMARY OF THE INVENTION

Accordingly, it is an object of this invention to provide a novel telephone system capable of recording a message from a calling party, and having and convenient portability.

Briefly stated according to this invention, instead of directly recording a voice signal or the like from a remote party, a message is transmitted by depressing keys of a telephone set of the remote party and a DTMF signal is transmitted from the remote party and is received and is stored in a memory device by decoding the DTMF signal. The term DTMF signal generally implies a push button signal and comprises a combination of two voice frequency signals generated for the purpose of identifying depressed keys of a telephone set.

The message from the remote set may comprise, for example, the telephone number of the remote set. Where the message is made to correspond to a predetermined message from respective keys of the telephone set, for example, "please telephone me" or "I will telephone again", transmission of messages other than telephone numbers is possible.

According to this invention, there is provided a telephone system having an automatic response function wherein a predetermined answer message is automatically sent to a calling originator when a speaking path to the calling originator is established in response to a call signal originated by the calling originator, comprising a DTMF signal decoder which decodes a DTMF signal sent from the calling originator as a result of key operation at the originator after the speaking path has been established, and a memory means for storing operated key data corresponding to the output of the DTMF signal decoder.

According to a modification of this invention, there is provided a telephone system of the type wherein a speaking path to a calling originator is established in response to arrival of a call signal originated by the calling originator and a predetermined message is automatically sent to the calling originator, characterized in that there are provided first memory means for storing data corresponding to a plurality of unit voices constituting the predetermined message to be sent to the calling originator; voice synthesizing means for forming a voice signal corresponding to the predetermined message by selecting and synthesizing arbitrary data among data stored in the first memory means; a DTMF signal decoder for receiving and decoding a DTMF signal originated by a calling originator by operation of a key of the calling originator in response to the predetermined message; and second memory means responsive to the output of the DTMF signal decoder for storing data corresponding to an operated key in the calling originator.

The telephone system of this invention having the construction described above, can be constituted with integrated circuits so that it is possible to miniaturize the telephone system and to decrease its manufacturing cost and installation space requirements. Further, the telephone system of this invention can be operated by a battery so that the telephone system can be mounted on a motor car or applied to such radio telephone system as a cordless telephone set. Moreover, as the telephone system of this invention is constituted by electrically operating circuit element its life can be elongated. Especially, instead of storing the message from a calling party in the form of a voice, since the message is stored as a telephone number utilizing a DTMF signal, not only can the capacity of the memory device can be reduced but also automatic calling is possible by utilizing information stored in the memory device.

BRIEF DESCRIPTION OF THE DRAWINGS

In the accompanying drawings:

FIG. 3 through 6 are flow charts showing the program-controlled operation of the telephone system of FIG. 1.

DESCRIPTION OF THE PREFERRED EMBODIMENT

Figure 1:
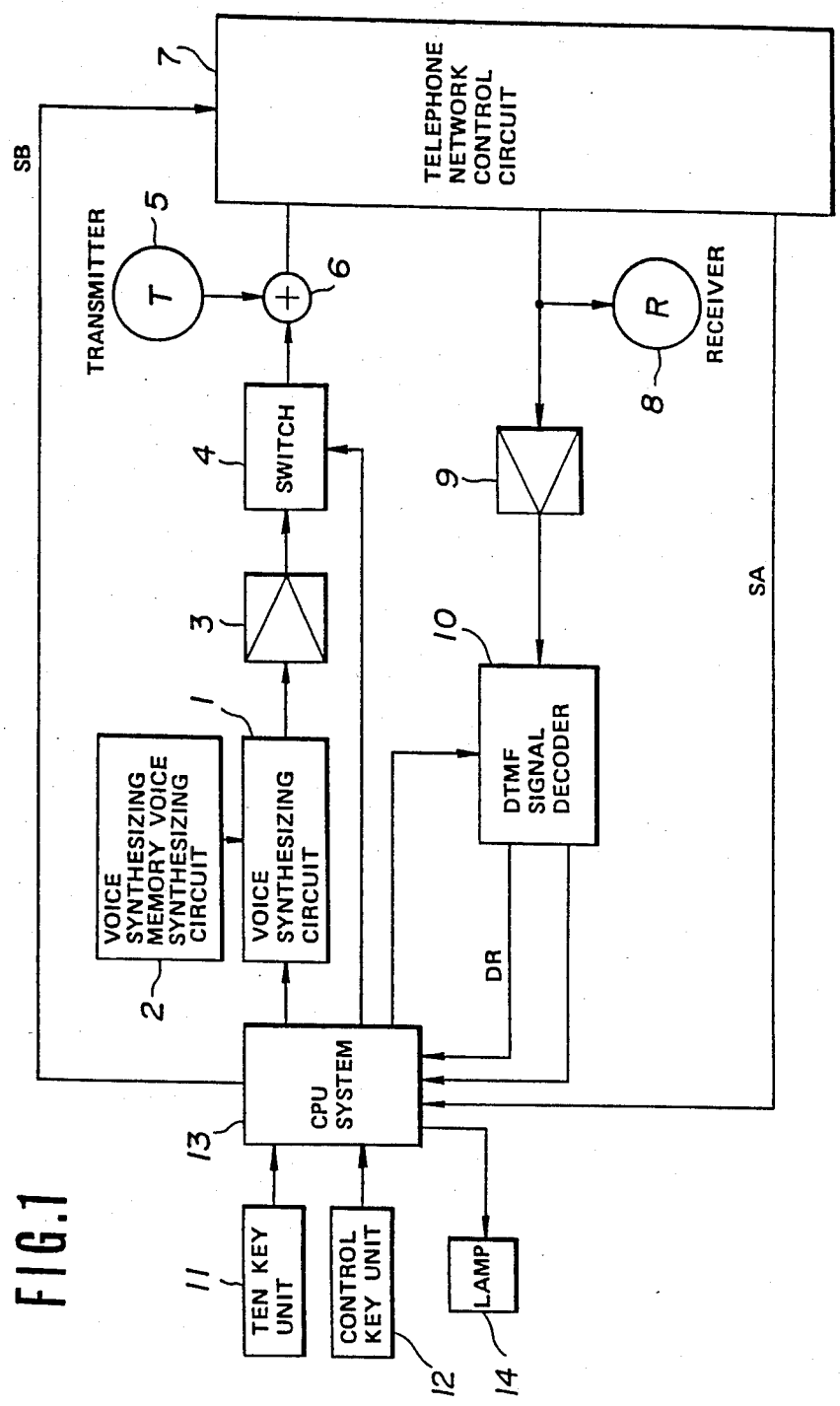
FIG. 1 is a block diagram showing one embodiment of the telephone system embodying the invention.

A preferred embodiment of this invention shown in FIG. 1 comprises a voice synthesizing circuit 1, a voice synthesizing memory device 2, an amplifier 3 for amplifying a voice signal outputted from the voice synthesizing circuit 1, a switch 4 for supplying to the output side of a transmitter 5 a voice signal generated by the voice synthesizing circuit at the time of responding to a calling party, a synthesizer 6 that synthesizes the output signal of the transmitter 5 and the output signal of the switch 4, a telephone network control circuit 7 that controls establishment of a radio speaking channel to a remote office, a receiver 8, an amplifier 9 amplifying a DTMF signal or a so-called PB signal from the remote office, a DTMF signal decoder 10 that decodes the telephone number of a calling party sent in the form of a DTMF signal, a ten key unit 11 sending out a dial number, a control key unit 12 for controlling automatic response performance, a CPU system 13 including memory elements which store own telephone number inputted from the ten key unit 11 or telephone number to be called outputted from the DTMF signal decoder 10, the CPU system 13 giving to the voice synthesizing circuit 1 own telephone number or liaison (forwarding) telephone number together with a predetermined message stored in the voice synthesizing memory device 2 for synthesizing a voice signal corresponding to these informations when a call signal from a calling party reaches, and a lamp 14 displaying the fact that the telephone number of the calling party has been stored.

Figure 2:
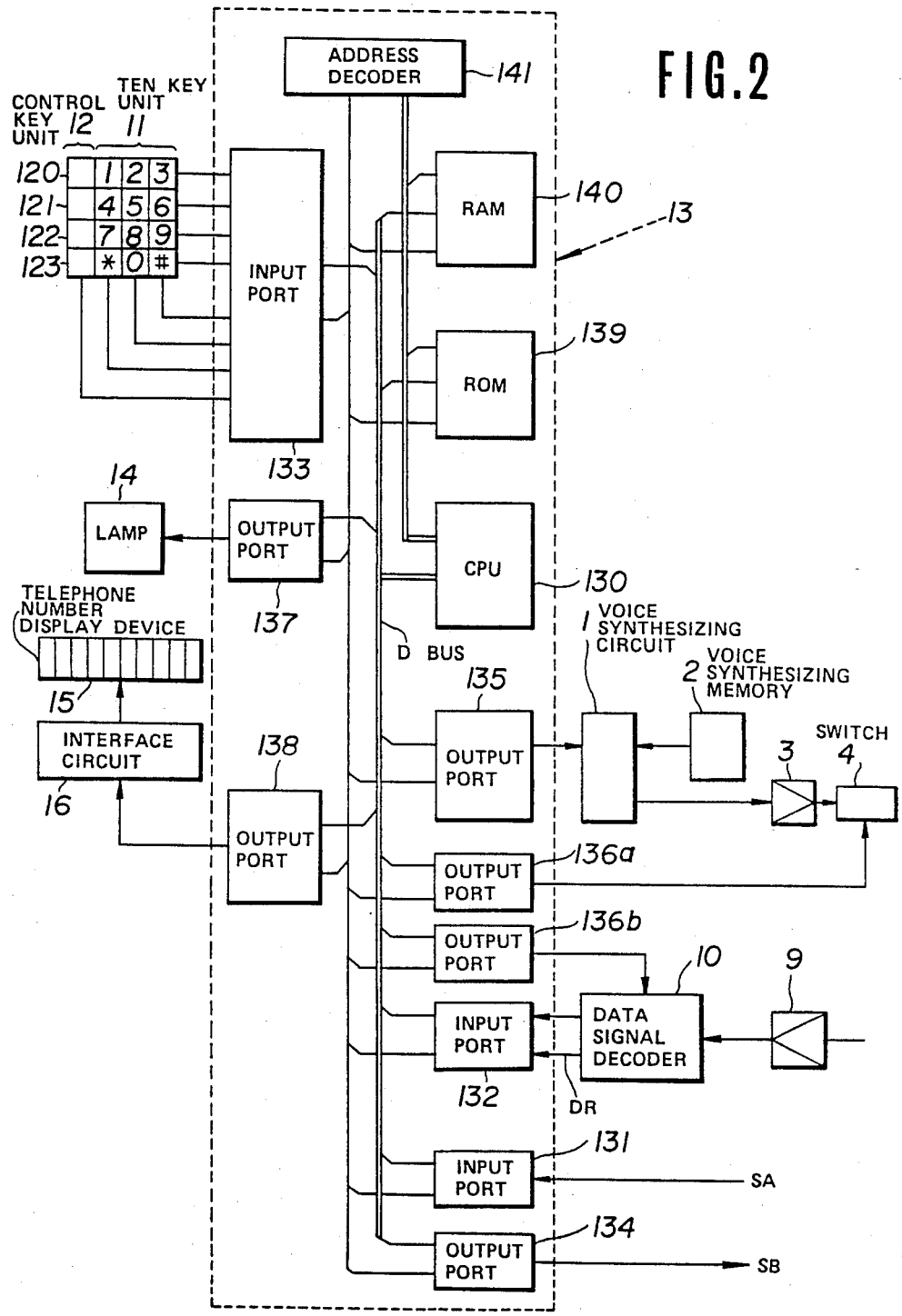
FIG. 2 is a block diagram showing a CPU system utilized in the system shown in FIG. 1.

FIG. 2 is a block diagram showing the detail of the CPU system 13, the essential portion of this invention, and the peripheral apparatus. The CPU system 13 comprises three input ports 131–133, six output ports 134, 135, 136a, 136b, 137 and 138, a ROM 139 storing a control program, a RAM 140 storing the own telephone number, and the calling party telephone number, and an address decoder 141 for selecting one of the output ports in addition to a central processing unit (CPU) 130. The ten key unit 11 is provided with digit keys of $0-9$, an asterisk key (*) and a number key (#), while the control key unit is provided with a message key 120, a transmission key 121, a regeneration key 122, and a clear key 123. The ON.OFF signal of these keys are sent to a data bus line D.BUS of CUP 139 via input port 133.

Figure 3:
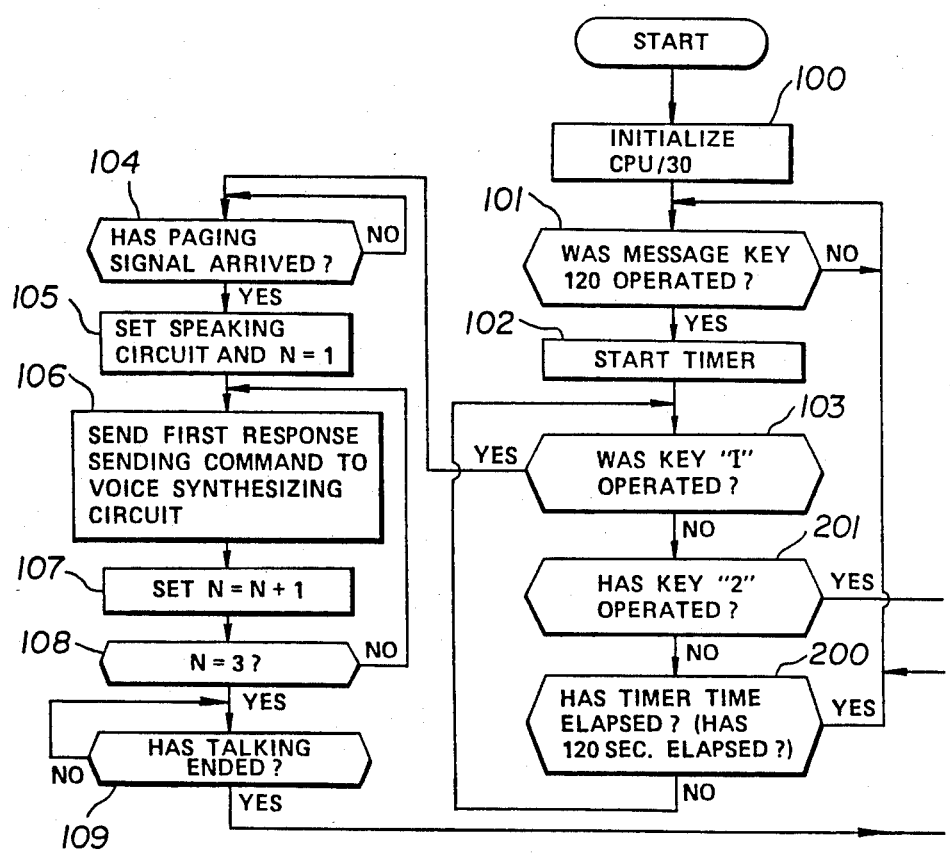

In addition to lamp 14, there are also provided a number display device for displaying the telephone number of the calling party and an interface circuit 16 for display. The operation of the wireless telephone system having the construction described above will be described as follows with reference to the flow chart shown in FIG. 3. Immediately after closing a source switch, not shown, the CPU 130 is initialized at step 100. Then at step 101 a check is made as to whether the message key 120 was operated or not. The message key 120 is provided for the purpose of selecting the automatic response performance of this invention or not. Accordingly, when the message key 120 was not operated the CPU does not execute the program following step 102. In other words, the automatic response performance is not provided. However, when the message key 120 was operated, the circuit is prepared for providing the automatic response characteristic so as to start a timer, not shown. Then at step 103 a judgment is made as to whether the key $1$ of the ten key unit 11 has been operated or not.

Following the operation of the message 120, when key $1$ of the ten key unit 11 is operated a liaison (forwarding) telephone number is sent back with voice in response to a paging (first made). When the result of judgment executed at step 103 is YES, at step 104, a state for waiting arrival of a paging signal from the calling party is established. When a paging signal SA is received through the telephone network control circuit 7 under this state, the CPU 130 sends a control signal SB to the telephone network control circuit 7 to establish a speaking circuit to the calling party as well as a condition N=1 at step 105. Furthermore, CPU 130 turns ON switch via output port 136a and sends a first response message sending command to the voice synthesizing circuit 1 via output port 135 at step 106. Further, the CPU reads out the own telephone number and the liaison telephone number which have been previously stored in RAM 140 by the operation of ten key unit 11 and sends the read out telephone number to the voice synthesizing circuit 1 via output port 135. Then in response to the first response message sending command the voice synthesizing circuit 1 reads out the message information of the first response message from the voice synthesizing memory device 2 to synthesize a first message voice signal by combining the message information, the own telephone number and the liaison telephone number.

The contents of the voice signal are "This is xxxx (own telephone No.), but now absent", and "if urgent please call xxxx (the liaison telephone number)" and the voice signal is supplied in parallel to the output side of the transmitter 5 via amplifier 3 and switch 4.

As a consequence, the first response message is sent back to the calling party through the speaking line. Upon completion of the sending back of the first response message, at step 107, a condition N=N+1 is set. Then, at step 108 a judgment is made as to whether N=3 or not. When N≠0, the program is returned to step 106 to repeat sending back of the first response message. Sending back of the first response message is repeated 3 times, that is until the result of judgment executed at step 108 becomes n=3. Thereafter, when the end of talking is judged at step 109, the program is returned to the initial state.

The following describes the case wherein subsequent to the operation of the message key 120, key 2 of the ten key unit 11 is operated. In this case, a second mode to be described hereunder is selected. More particularly, at step 201 a judgment is made as to whether key 2 of the ten key unit 11 has been operated or not. When the result of judgment at step 201 is YES, the program is branched to step 202. On the other hand, when the result of judgment at step 201 is NO, at step 200, a judgment is made as to whether the timer time has elapsed or not, in other words whether 120 seconds, for example, have elapsed or not after the timer has started. When it is judged that the timer time has elapsed, the program is returned to the initial state.

At step 202, arrival of a paging signal from the calling party is waited. Under this state, when the paging signal is received through the telephone network control circuit 7, the CPU 130 supplies a control signal SB to the telephone network control circuit 7 to establish a speaking circuit to the calling party, to turn ON switch 4 via output port 136a and to send a second response message sending out command to the voice synthesizing circuit 1 via output port 135 at step 203. Furthermore, by operating a key of ten key unit 11 the own telephone number stored in RAM 140 is read out and supplied to the voice synthesizing circuit 1 via output port 135. Then the voice signal synthesizing circuit 1 supplied with the first response sending out command reads out the message information of the second response message from the voice synthesizing memory device 2 and combines the read out information with the information of the telephone number of the own office for synthesizing a voice signal of the second response message "This is xxx xxxx (own office telephone number). Since a called person is now absent, please input your telephone number by depressing the dial buttons. After completing inputting operation, please depress an asterisk key" and then supplying in parallel the synthesized voice signal to the output side of the transmitter 5 via amplifier 3 and switch 4. Accordingly the second response signal is sent to the calling party via the speaking circuit.

Under this stage a message from the calling party is waited. At this time when the calling party depresses a push button (ten key) corresponding to its own telephone number a resulting DTMF signal is applied to amplifier 9 via the radio speaking path. This DTMF signal is decoded, digit after digit, by the DTMF signal decoder 10 as the calling party telephone number which is supplied to input port 132 of CPU system 13. Since the decoder 10 is constructed to send out a data ready signal DR of "1" each time decoding operation of one digits completes, at step 204 the CPU 130 supervises via input port 132 whether the data ready signal DR has become "1" or not. Then the decoding of the first order digit of the calling party telephone number completes and the data ready signal DR is outputted from the decoder 10. Then at step 205 the first order digit outputted from the decoder 10 is written into RAM 140 via input port 132. Then at step 206 a judgment is made as to whether the digit written at this time correspond to the asterisk key or not. When the result of judgment of step 206 is NO, at step 207 the digit written at this time is stored in RAM 140 as the first digit of the calling party telephone number. Thereafter, for the purpose of writing the second and following digits the supervision of the data ready signal is resumed. When the second digit is decoded, this digit is stored in RAM 140 in the same manner as above described. In this manner, steps 204-207 are repeatedly executed so as to store all digits of the calling party telephone number in RAM 140. Thereafter the calling party depresses its asterisk key and when the decoded information of this key is written by decoder 10, at step 208, for the purpose of permitting the calling party to confirm its telephone number CPU 130 sends a third response message sending out command to the voice synthesizing circuit 1 at step 208 and transfers the calling party telephone number information stored in the RAM 140 to the voice synthesizing circuit 1.

Then the voice synthesizing circuit 1 reads out the voice information of the third response message from the voice synthesizing memory device 2 to combine the read out information with the calling party telephone number information for synthesizing a voice signal "the telephone signal inputted by you is xxxxxxx (the telephone number written RAM 140). If it is correct, please depress the number (#) key. If not correct, please depress the asterisk key and then input again", the voice signal being supplied to the output side of the transmitter 5. In this manner, the third response message is transmitted to the calling party in the form of a voice.

If the calling party telephone number stored in the RAM 140 were correct the calling party depresses its number (#), but if not correct, depresses the asterisk key for sending these key informations to the called party as a DTMF signal.

At this time, at step 209, the CPU 130 is supervising as to whether the data ready signal DR has become "1" or not after sending out the third response signal. If the result of check at step 209 is YES, at step 210, the code information of the number key or the asterisk key sent as the DTMF signal is written into RAM 140. Then at steps 211 and 212 judgments are made whether the written information corresponds to the number key or the asterisk key. When the result of judgment shows the number key, at step 213, the calling party telephone number which was previously stored in RAM is confirmed as a correct one and this number is stored again. Then at step 214, a light signal of lamp 14 informing to the called party the fact that the called party telephone number has been stored in RAM 140 is sent out through output port 137, whereby lamp 14 is lighted.

Then at step 215, the CPU 130 sends a transmission command for a fourth response message to the voice synthesizing circuit 1. Then the voice synthesizing circuit 1 reads out the voice information of the fourth response message from the voice synthesizing memory device 2 to synthesize a voice signal "The telephone number inputted by you was stored. Thank you" and sends out this voice signal to the radio speaking path between the calling party and the called party via switch 4. Consequently, the fourth response message is transmitted to the calling party with voice. Thereafter, at step 216, when the end of the speech is judged the program is returned to the initial state.

Where the calling party telephone number stored in RAM 140 is not correct so that when the calling party sends the information of the asterisk key the CPU 130 returns to a state immediately after sending out the second response message for the purpose of receiving again the calling party telephone number. In other words, the program is returned to step 204 for supervising the data ready signal DR. In either of the first and second modes, when the speaking path is opened as a result of hook-off of the calling party, the program is returned to the initial state by judging that the speech has ended. To simplify the drawing the processing flow chart for this purpose is not shown in FIG. 3.

Figure 4:
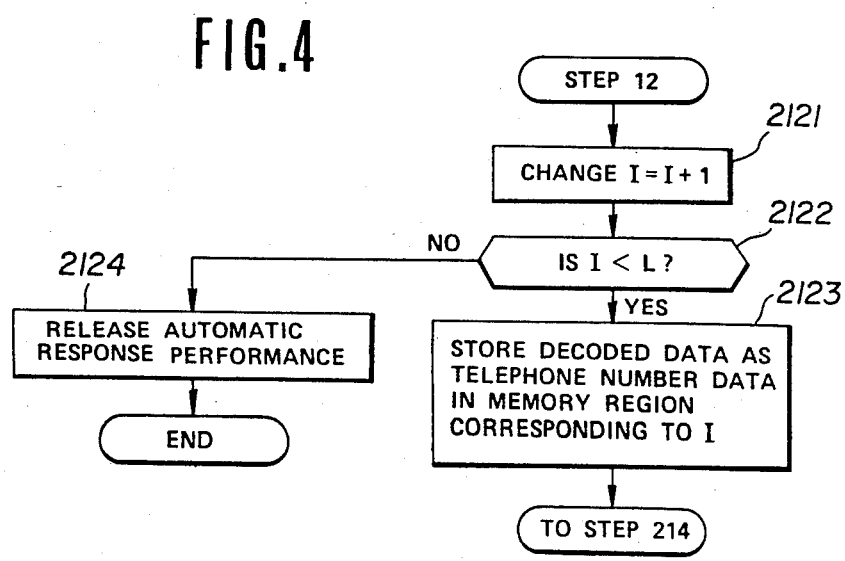
Figure 5:
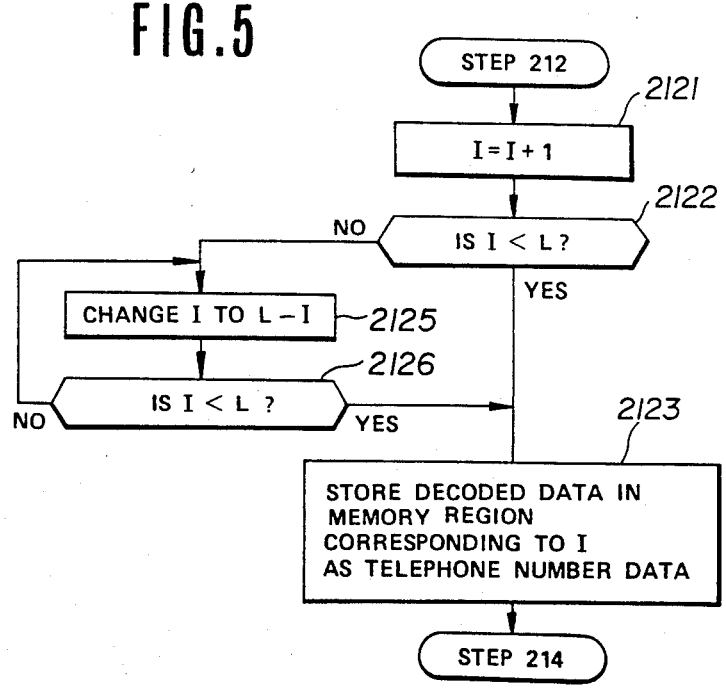

Although in the foregoing embodiment, the number of the calling party telephone numbers was not limited, if necessary the number can be limited to a definite number. FIG. 4 and 5 show examples of the flow charts of such case. In the flow chart shown in FIG. 4, as the number of the calling party telephone numbers stored in RAM 140 reaches L the automatic response characteristic set by the operation of the message key is reset. More particularly, when the operation of the number key is confirmed at step 212, at step 2121, the value I corresponding to the calling party telephone number stored in RAM 140 is changed to I+1, provided that it is assumed that the value I has been cleared to 0 at the initializing step described above. Then at step 2122, a judgment is made as to whether $I<L$ or not and when the result of judgment is YES the decoded data of the DTMF signal decoder 10 is stored in a region of RAM 140 corresponding to value I as telephone number data, and then the program is transferred to step 214 shown in FIG. 3. However, when the result of judgment at step 2122 is NO, at step 2124 the automatic response performance is released, thus terminating a series of processings.

In the flow chart shown in FIG. 5, as the number of the calling party telephone number stored in the RAM 140 reaches the predetermined number L, the value I is set again to 0 and the calling party telephone number which has been stored in the region of $I=0$ is erased and instead a new calling party telephone number is stored. More particulary, when the result of judgment at step 2122 is NO, at step 2125 a condition $I=L-I$ is set and at the next step 2126 a judgment $I<L$ is made. When the result of judgment at step 2126 is YES, at step 2123 decoded data is stored in a memory region corresponding to I as telephone number data. When the result of judgment at step 2126 is NO, the program is returned to step 2125 to set I=L−I. Other processings are the same as those shown in FIG. 4.

By the operations described above, a response message is sent to the calling party and the calling party telephone number is stored in RAM 140 as the calling party's message.

The operations caused by depressions of transmission key 121, regenerating key 122 and clear key 123 will now be described with reference to a flow chart shown in FIG. 6. At first, at step 300, a judgment is made as to whether the regeneration key 122 has been operated or not. When the result of this judgment is YES, at step 301, a timer, not shown, is started, and at step 302, a judgment is made as to whether the ten key has been operated or not. When the ten key has been operated, at step 303 the timer is cleared, and at step 304 the telephone number data stored in a memory region of RAM 140 corresponding to the operated ten key are read out. Then at step 305, the read out telephone number data are displayed on the display device 15.

After that, at step 306 a judgment is made again as to whether the regenerating key 122 has been operated or not, and when the result of this judgment is YES, the program is returned to step 301 to repeat the operation described above. More particularly, when the ten key is operated following the operation of the regenerating key 122, the telephone number data which have been stored in a region of RAM 140 corresponding to RAM 140 are displayed on display device 15. When the result of judgment executed at step 302 is NO, at step 310, a judgment is made as to whether the timer time (120 sec. for example) has elapsed or not. When the result of this judgment is NO, the program is returned to step 302, whereas when the result of judgment at step 310 is YES, the timer is cleared at step 311 and the program is returned to step 300. More particularly, when the ten key is operated within 120 seconds after operation of the regenerating key, the program is returned to the initial state. When the result of judgment at step 306 is NO, at step 307, a judgment is made as to whether the clear key 123 has operated or not. When the result of this judgment is YES, at step 312, the telephone number data read out from the RAM 140 and are now being displayed on display device 15 are erased, thus causing the display device 15 to display a blank. More particularly, while a given telephone number is being displayed on display device 15, when the clear key 123 is depressed, the memory of the displayed data is cleared so that the display device 15 displays the blank. Then the program is returned to step 300. When the result of judgment at step 307 is NO, at step 308, a judgment is made as to whether the oscillation key 121 has been operated or not. When the result of this judgment is YES, at step 309 a predetermined calling operation is made. More particularly, when the oscillation key 121 is depressed while the given telephone number is being displayed on the display device 15, a call is made for the party corresponding to the telephone number data displayed on the display device 15. When the result of judgment at step 308 is NO, the program is returned back to step 306.

We claim:

1. A telephone system comprising:
   first memory means for storing unit audio data for synthesizing voice messages;
   a DTMF signal decoder for receiving and decoding a DTMF signal generated in response to operation of signal keys by a calling party over a signal path;
   means for controlling said DTMF signal decoder to decode a first number sequence transmitted via said signal keys by said calling party;
   second memory means for storing said decoded number sequence;
   voice synthesizing means for accessing said unit audio data stored in said first memory means and for transmitting to said calling party over said signal path a confirmatory audio message composed of selected unit audio data, said message including a repetition of said first number sequence stored in said second memory means and a request to enter a reply thereto; and
   means responsive to said DTMF signal decoder for interrupting said signal path to said calling party upon receiving a first reply from said calling party, and, in response to a second reply from said calling party, for conditioning said DTMF decoder to receive and decode a second number sequence transmitted by said calling party.

2. The telephone system of claim 1 further comprising:
   means for controlling said voice synthesizing means to transmit to said calling party prior to transmission of said confirmatory audio message a prefatory audio message requesting that the calling party enter an identifying number sequence.

3. The telephone system of claim 2 wherein said first number sequence includes the telephone number of said calling party.

4. The telephone system of claim 3 wherein said first reply entered by said calling party comprises a signal representing a non-numerical digit indicating that said first number sequence is correct.

5. The telephone system of claim 3 wherein said second reply entered by said calling party comprises a signal representing a non-numerical digit indicating that said first number sequence is incorrect.

6. The telephone system according to claim 1 wherein said unit audio data comprises a word, a phrase and digits.

7. The telephone system according to claim 2 wherein said prefatory audio message formed by said voice synthesizing means comprises a previously recorded own party telephone number.

8. The telephone system according to claim 2 wherein said prefatory audio message formed by said voice synthesizing means comprises a previously recorded liaison telephone number.

9. The telephone system according to claim 1 wherein said second memory means sequentially stores each number sequence received from each calling party.

10. The telephone system according to claim 9 wherein after the number of said stored number sequences reaches a preset number, the first-stored number sequence is erased and the next-received number sequence is stored in its place.

11. The telephone system according to claim 1 further comprising a regenerating key, and display means sequentially displaying the number sequence of each calling party stored in said second memory means.

12. The telephone system according to claim 11 wherein when a predetermined address of said second memory means is designated by keyed input data following the operation of said regenerating key, and a number sequence of a calling party stored at said designated address is displayed on said display means.

13. The telephone system according to claim 12 further comprising a clear key operable so that when said clear key is actuated while a number sequence of a calling party is being displayed on said display means, said display is blanked and the number sequence stored in said second memory means corresponding to said displayed number sequence is cleared.

14. The telephone system according to claim 1 wherein said number sequence represents a telephone number and wherein said system further comprises a calling key operable so that when said calling key is operated while the number sequence of a calling party is being displayed on said display means, a call signal is originated to the calling party whose number sequence is being displayed on said display means.

15. The telephone system according to claim 1 wherein at least a portion of said signal path comprises a wireless path.

16. The telephone system according to claim 9 wherein the operation of said second memory means for storing decoded number sequences is inhibited when the number of number sequences stored in said second memory reaches a preset number.

* * * * *